(12) United States Patent
Kuan et al.

(10) Patent No.: US 7,086,904 B1
(45) Date of Patent: Aug. 8, 2006

(54) CARD CONNECTOR

(75) Inventors: Chi-Te Kuan, Shulin (TW); Jia-Shiu Wu, Shulin (TW)

(73) Assignee: L&K Precision Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 11/139,470

(22) Filed: May 31, 2005

(51) Int. Cl.
*H01H 24/00* (2006.01)
(52) U.S. Cl. ..................... 439/630; 439/625
(58) Field of Classification Search ........... 439/630, 439/625, 626, 632, 633
See application file for complete search history.

(56) References Cited

U.S. PATENT DOCUMENTS

| | | | |
|---|---|---|---|
| 5,823,828 A * | 10/1998 | Bricaud et al. | 439/630 |
| 6,086,424 A * | 7/2000 | Chang | 439/630 |
| 6,095,868 A * | 8/2000 | Hyland et al. | 439/630 |
| 6,149,466 A * | 11/2000 | Bricaud et al. | 439/630 |
| 6,261,113 B1 * | 7/2001 | Chen | 439/260 |
| 6,764,327 B1 * | 7/2004 | Yu | 439/188 |
| 6,811,443 B1 * | 11/2004 | Machihara et al. | 439/630 |
| 6,814,597 B1 * | 11/2004 | Kao | 439/159 |
| 6,881,097 B1 * | 4/2005 | Matsunaga et al. | 439/630 |

* cited by examiner

*Primary Examiner*—Tulsidas C. Patel
*Assistant Examiner*—Vladimir Imas
(74) *Attorney, Agent, or Firm*—Troxell Law Office, PLLC

(57) ABSTRACT

A card connector is used for SIM card and has an insulative frame and a plurality of conductive terminals received in the insulative frame. Each conductive terminal includes a body, and a contact arm inclined upwardly and unitarily stamped from the body. The contact arm has a connecting portion and a contact portion. An anchor is unitarily and upwardly stamped from the body. A soldering arm extends opposite the connecting portion of the contact arm. The contact arms of the conductive terminals have desirable resiliency and low profile. Correspondingly, the overall height of the card connector reduces, thereby meeting the tendency of miniature.

11 Claims, 5 Drawing Sheets

CARD CONNECTOR

BACKGROUND OF THE INVENTION

1. Field of the Invention

The present invention relates to a card connector, and particularly to a card connector adapted for Subscriber Identity Module Card (SIM Card) of mobile phones and having low profile for meeting tendency of miniature.

2. Related Art

A SIM card commonly sets a password of discerning subscriber personal identity for a mobile phone. The mobile phone can not work lacking of a SIM card. A card connector with conductive terminals is often provided to electrically connect the SIM card to the mobile phone. Soldering ends of the conductive terminals are mounted on a main board of the mobile phone, and contact portions of the conductive terminals engage contact sheet of the SIM card for signal transmission.

In prior art, conductive terminals of the card connectors often form suspending contact portions which are bent for possessing flexibility up and down. However, the contact portions have to be bent at a fixed bending angle in that restraint of material and shaping conditions. The fixed bending angle limits height of contact portions, and therefore limits overall height of the card connector. The contact portions of the conductive terminals of prior art can not become lower, depressing the miniature tendency. Moreover, material cost can not be decreased for function requirements of the conductive terminals.

SUMMARY OF THE INVENTION

Accordingly, an object of the present invention is to provide a card connector which meeting miniature tendency, wherein conductive terminals thereof are not subject to shaping conditions, contact arms of the conductive terminals have desirable resiliency and low profile, and the overall height of the card connector relatively decreases.

The card connector comprises an insulative frame and a plurality of conductive terminals. The insulative frame defines a plurality of passageways, and the conductive terminals are received in the passageways. Each conductive terminal includes a body, and a contact arm upwardly inclined and unitarily stamped from the body. The contact arm has a connecting portion and a contact portion. Anchors are unitarily and upwardly stamped from the body. A soldering arm extends opposite the connecting portion of the contact arm.

DESCRIPTION OF THE PREFERRED EMBODIMENTS

Figure 1:
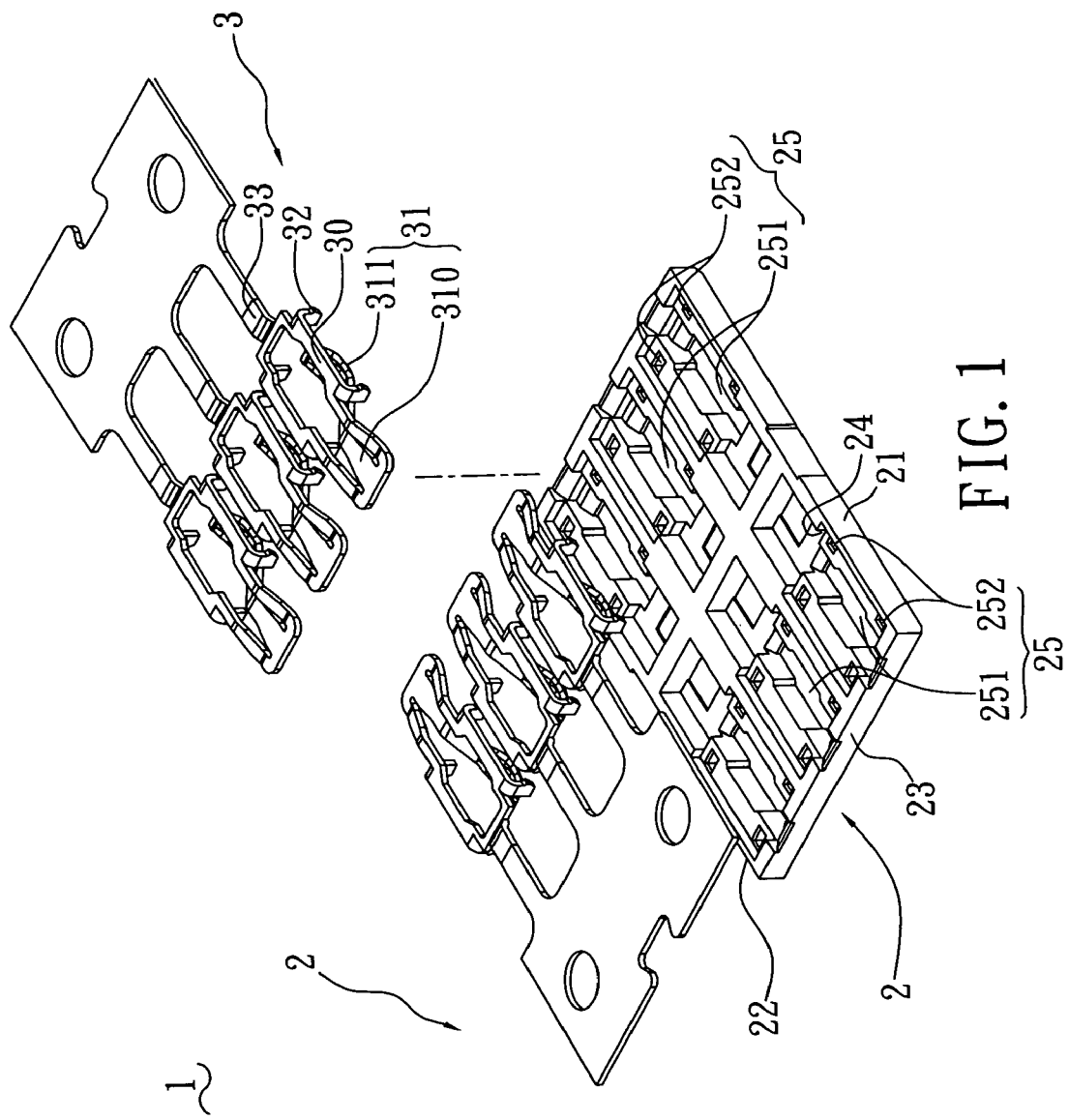
FIG. 1 is an exploded view of a card connector according to a first embodiment of the present invention, wherein three conductive terminals are placed upside down for clearly showing structures thereof.
Figures 2, 3:
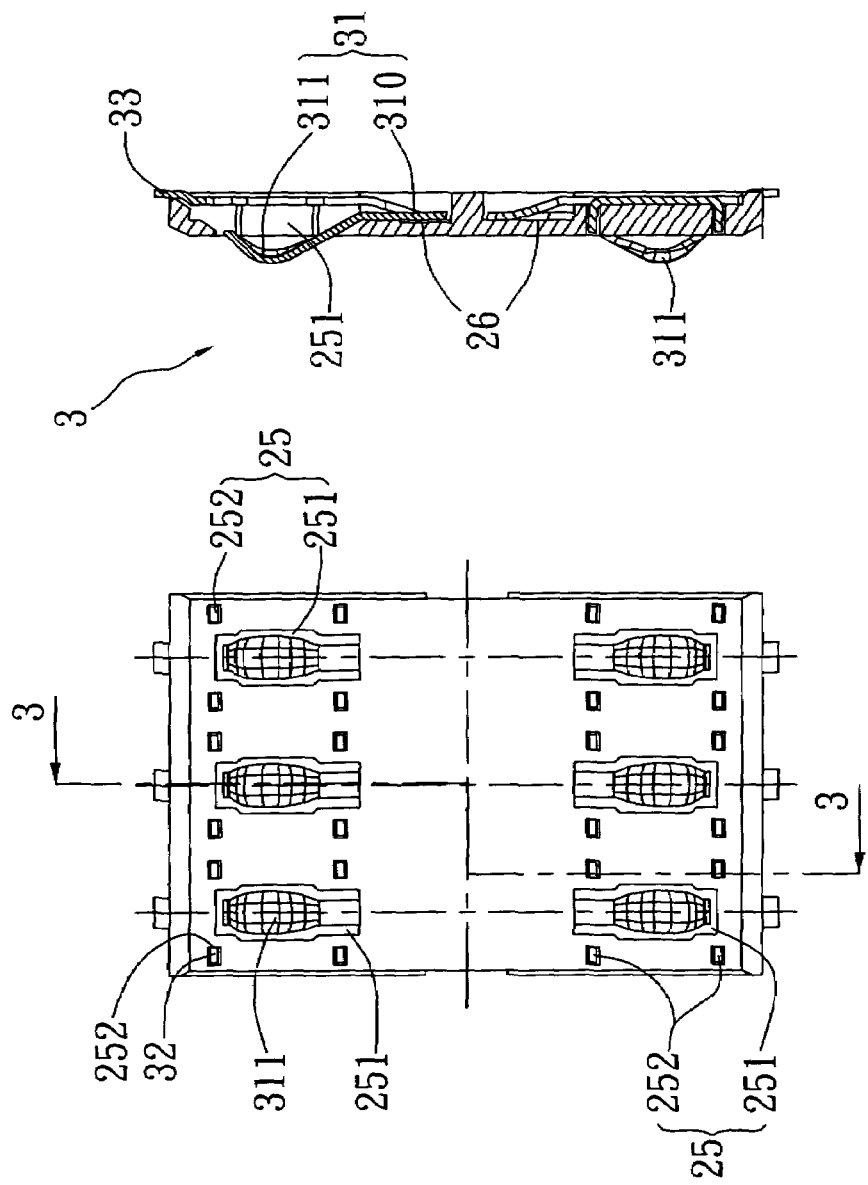
FIG. 2 is a top view of the card connector of FIG. 1, wherein the card connector is assembled.
FIG. 3 is a cross-sectional view taken along the line 3—3 of FIG. 2.

With reference to FIGS. 1 through 3, a card connector 1 in accordance with a first embodiment of the present invention comprises an insulative frame 2, and a plurality of conductive terminals 3 received in the insulative frame 2. The insulative frame 2 has a first side wall 21, a second side wall 22 and a bottom wall 23, which together define a slot 24 for receiving a SIM card (not shown) therein. A plurality of passageways 25 is defined in the bottom wall 23 for receiving the conductive terminals 3. The passageways 25 are distributed in two arrays, and each array has three passageways 25 spaced the same distance apart from each other. Each passageway 25 has a hollow portion 251 through the bottom wall 23 and a plurality of interferential portions 252 around the hollow portion 251. A stop wall 26 (shown in FIG. 3) is formed on a bottom of the bottom wall 23 and projects into the hollow portion 251, whereby a connecting portion 310 of a conductive terminal 3 abuts the stop wall 26, as described below.

The conductive terminals 3 are assembled in the passageways 25. Each conductive terminal 3 includes a body 30, a contact arm 31 inclined upwardly and unitarily stamped from the body 30. The contact arm 31 is received in the hollow portion 251 of a passageway 25 and has a connecting portion 310 and a contact portion 311. The contact portion 311 has arcuate shape for facilitating to engage a contact sheet of a SIM card. Anchors 32 are substantially perpendicularly bent and unitarily stamped from the body 30 and are upwardly fitted in the interferential portions 252 of a passageway 25. A soldering arm 33 extends and bends from the body 30 and opposite the connecting portion 310 of the contact arm 30 for surface mounting.

The conductive terminals 3 are extended into the passageways 25 from bottom to top. In assembly, as shown in FIG. 3, the contact portions 311 of the conductive terminals 3 are received in the hollow portions 251 of the passageways 25 for engaging the contact sheet of the SIM card. The anchors 32 of the conductive terminals 3 interferentially fit into inner walls of the interferential portions 252 of the passageways 25, whereby the conductive terminals 3 are retained on the insulative frame 2. The soldering arms 33 are soldered to a main board of a mobile phone (not shown). The conductive terminals 3 are unitarily formed as a whole, and have desirable resiliency and low profile. Correspondingly, the overall height of the card connector 1 reduces and meets the tendency of miniature.

Figure 4:
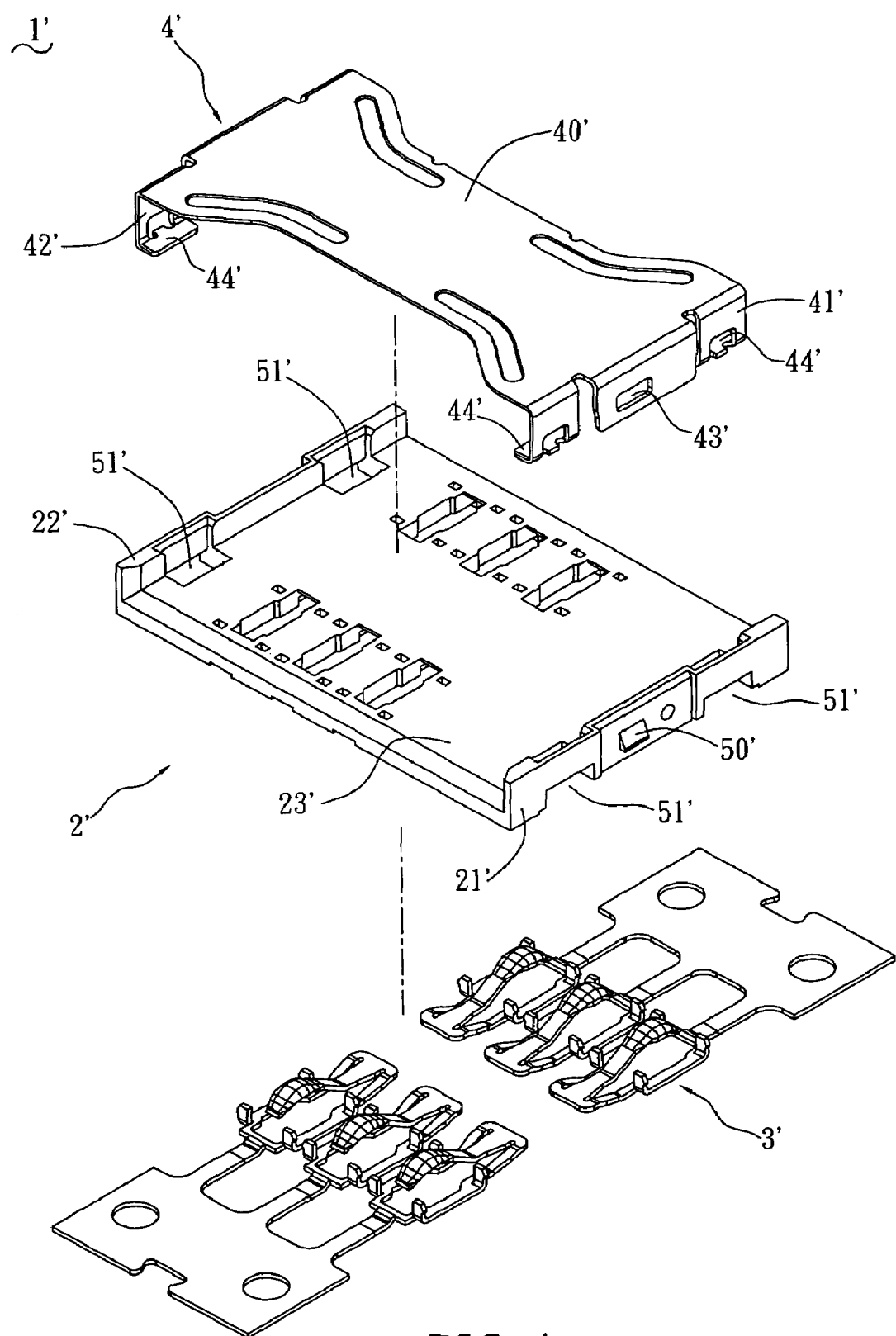
FIG. 4 is an exploded view of the card connector according to a second embodiment of the present invention.
Figure 5:
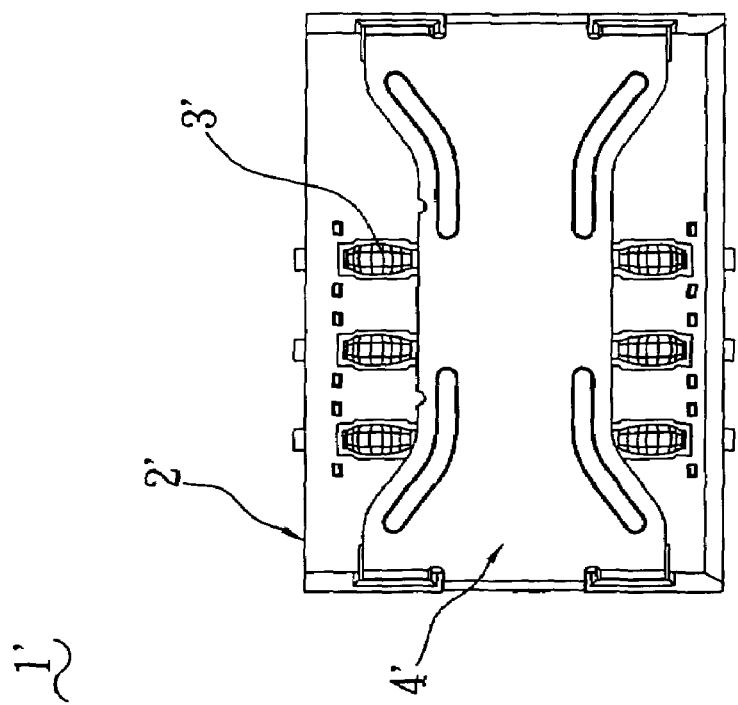
FIG. 5 is a top view of the card connector of FIG. 4, wherein the card connector is assembled.

FIGS. 4 and 5 illustrate a card connector 1' in accordance with a second embodiment of the present invention. The card connector 1' includes an insulative frame 2', a plurality of conductive terminals 3' and a shell 4'. The insulative frame 2' has a shape fitting to the shell 4' and generally differs from the insulative frame 2 of the first embodiment. First latch portions, for example latching posts 50', are respectively formed on sides of a first side wall 21' and a second side wall 22'. Second latch portions are formed on the shell 4' for cooperating with the first latch portions. The conductive terminals 3' have the same structure as the conductive terminals 3 of the first embodiment.

The shell 4' covers the bottom wall 23' of the insulative frame 2' for shielding from electromagnetic interference, and includes a first shielding wall 40', a second shielding wall 41' and a third shielding wall 42' respectively formed on opposite sides of the first shielding wall 40'. The second shielding wall 41' and the third shielding wall 42' are respectively mounted on the first side wall 21' and the second side wall 22'. The second latch portions mentioned above are latching recesses 43', which are defined in the second shielding wall 41' and the third shielding wall 42' for locking the latching posts 50' thereby retaining the shell 4' on the insulative frame 2'. Clamp arms 44' are formed on bottoms of the second shielding wall 41' and the third shielding wall 42', and clamp recesses 51' are respectively formed on bottoms of the first side wall 21' and the second side wall 22'. In assembly, the clamp arms 44' extend through the clamp recesses 51' and abut against a bottom of the bottom wall 23' for further retaining the shell 4'. The shell 4' in the second embodiment effectively protects the card connector 1' from external electromagnetic interference.

Figure 7:
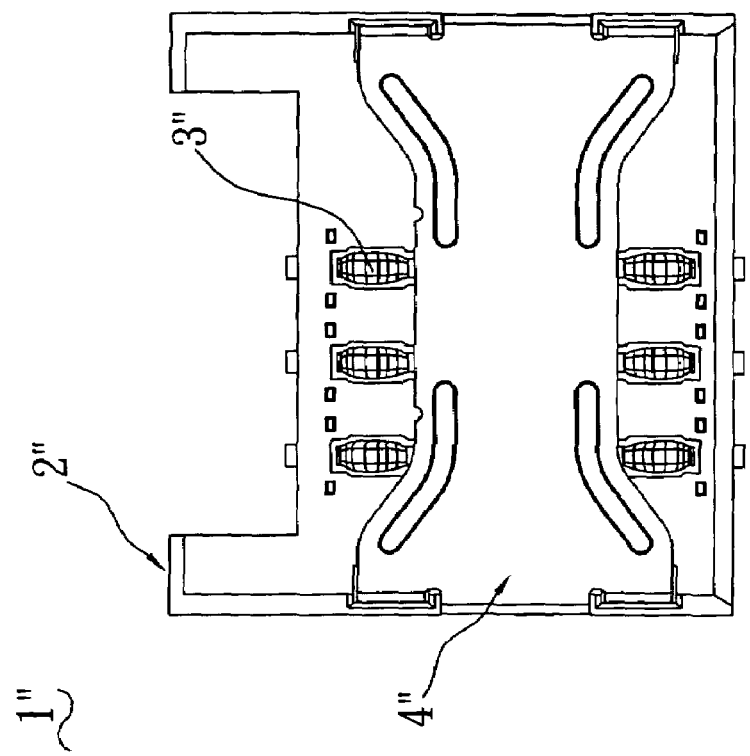
FIG. 7 is a top view of the card connector of FIG. 6, wherein the card connector is assembled.
Figure 6:
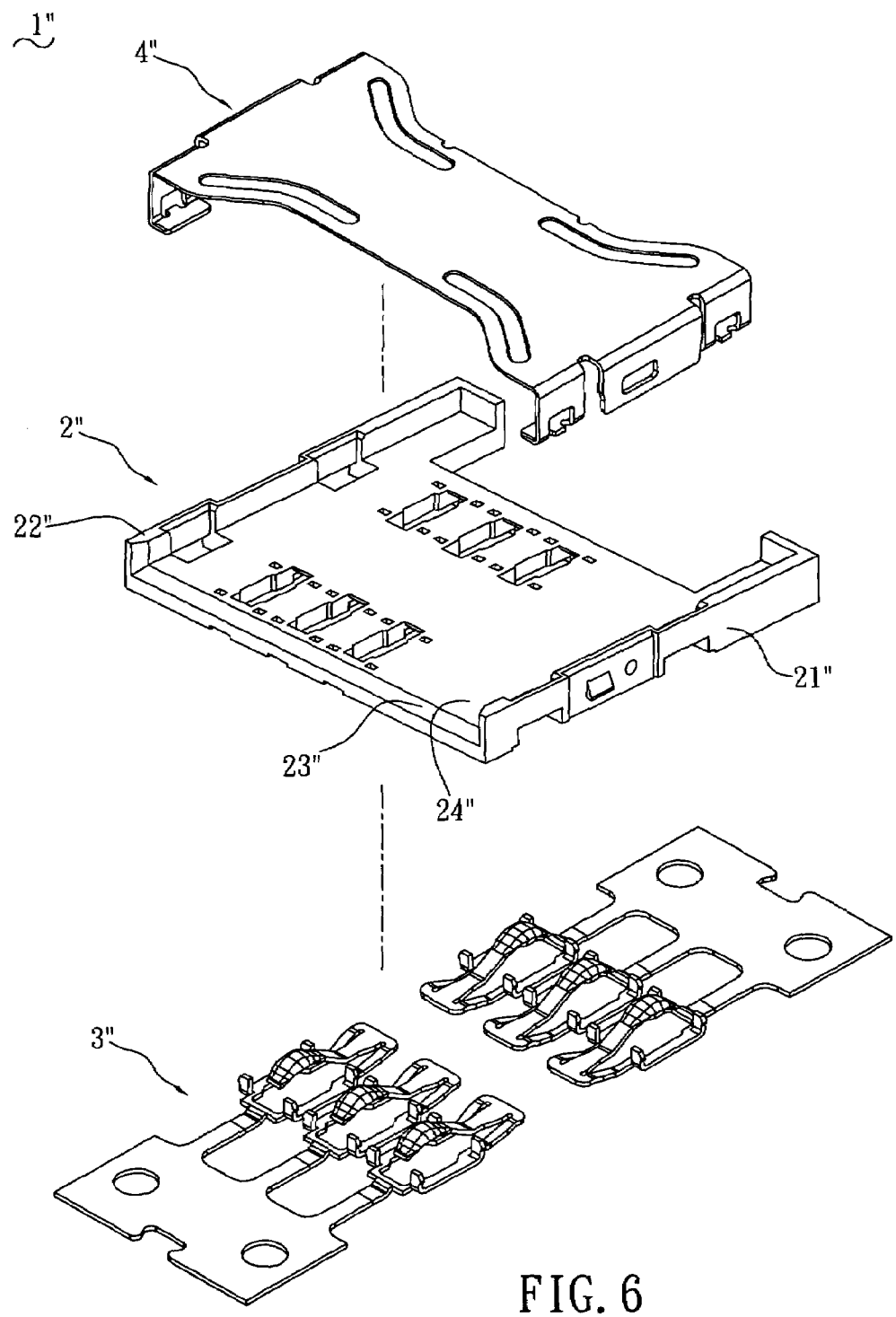
FIG. 6 is an exploded view of the card connector according to a third embodiment of the present invention.

FIGS. 6 and 7 illustrate a card connector 1" in accordance with a third embodiment of the present invention. The card connector 1" includes an insulative frame 2", a plurality of conductive terminals 3" and a shell 4". The card connector 1" is generally identical to the card connector 1' except that a slot 24" of the third embodiment. The slot 24" is defined by a first side wall 21", a second side wall 22" and a bottom wall 23" and appropriately extends into the first side wall 21" and second side wall 22" for lengthening width thereby being capable of accommodating different types of SIM cards.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A card connector for data transmission using a Subscriber Identity Module Card (SIM Card) of a mobile phone, the card connector comprising:
   a) an insulative frame having:
      i) a first side wall;
      ii) a second side wall;
      iii) a bottom wall having a plurality of passageways, each of the plurality of passageways has a hollow portion and a plurality of interferential portions spaced apart from and positioned around the hollow portion; and
      iv) a slot selectively receiving the SIM Card and defined by the first side wall, the second side wall, and the bottom wall; and
   b) a plurality of conductive terminals, one of the plurality of conductive terminals is inserted into each of the plurality of passageways, each of the plurality of conductive terminals having:
      i) a body;
      ii) a contact arm located in a center of the body and having a connecting portion and a contact portion, one contact portion is inserted into each hollow portion of one of the plurality of passageways, the contact portion protruding into the slot of the insulative frame;
      iii) a plurality of anchors extending from sides of the body, one of the plurality of anchors is inserted into each of the plurality of interferential portions of each hollow portion; and
      iv) a soldering arm extending from an end of the body opposite the contact potion of the contact arm, the solder arm is soldered to a main board of the mobile phone.

2. The card connector according to claim 1, wherein the plurality of passageways are distributed on the insulative frame in two arrays, each of the two arrays includes three passageways equally spaced apart.

3. The card connector according to claim 1, wherein the plurality of anchors extend perpendicularly from the body.

4. The card connector according to claim 1, wherein the bottom wall of the insulative frame includes a plurality of stop walls located on a bottom thereof, one of the plurality of stop walls communicating with each hollow portion, one connecting portion engaging each of the plurality of stop walls.

5. The card connector according to claim 1, wherein each of the plurality of conductive terminals has an arcuate shape for engaging a contact sheet of the SIM Card.

6. The card connector according to claim 1, wherein each soldering arm is bendable for surface mounting.

7. The card connector according to claim 1, wherein the slot has a size corresponding to the SIM Card.

8. The card connector according to claim 1, further comprising a shell covering the bottom wall of the insulative frame and having:
   a) a first shielding wall;
   b) a second shielding wall located on a first side of the first shielding wall; and
   c) a third shielding wall located on a second side of the first shielding wall.

9. The card connector according to claim 8, wherein each of the first side wall and the second side wall of the insulative frame has a first latch portion, each of the second shielding wall and third shielding wall of the shell has a second latch portion, and one first latch portion selectively engaging each second latch portion.

10. The card connector according to claim 9, wherein each first latch portion is a latching post, and each second latch portion is a latching recess.

11. The card connector according to claim 9, wherein each of the first side wall and the second side wall of the insulative frame has two clamp recesses, each of the second shielding wall and third shielding wall of the shell has two clamp arms, one clamp arm engaging each clamp recess.

* * * * *